United States Patent Office 2,782,583
Patented Feb. 26, 1957

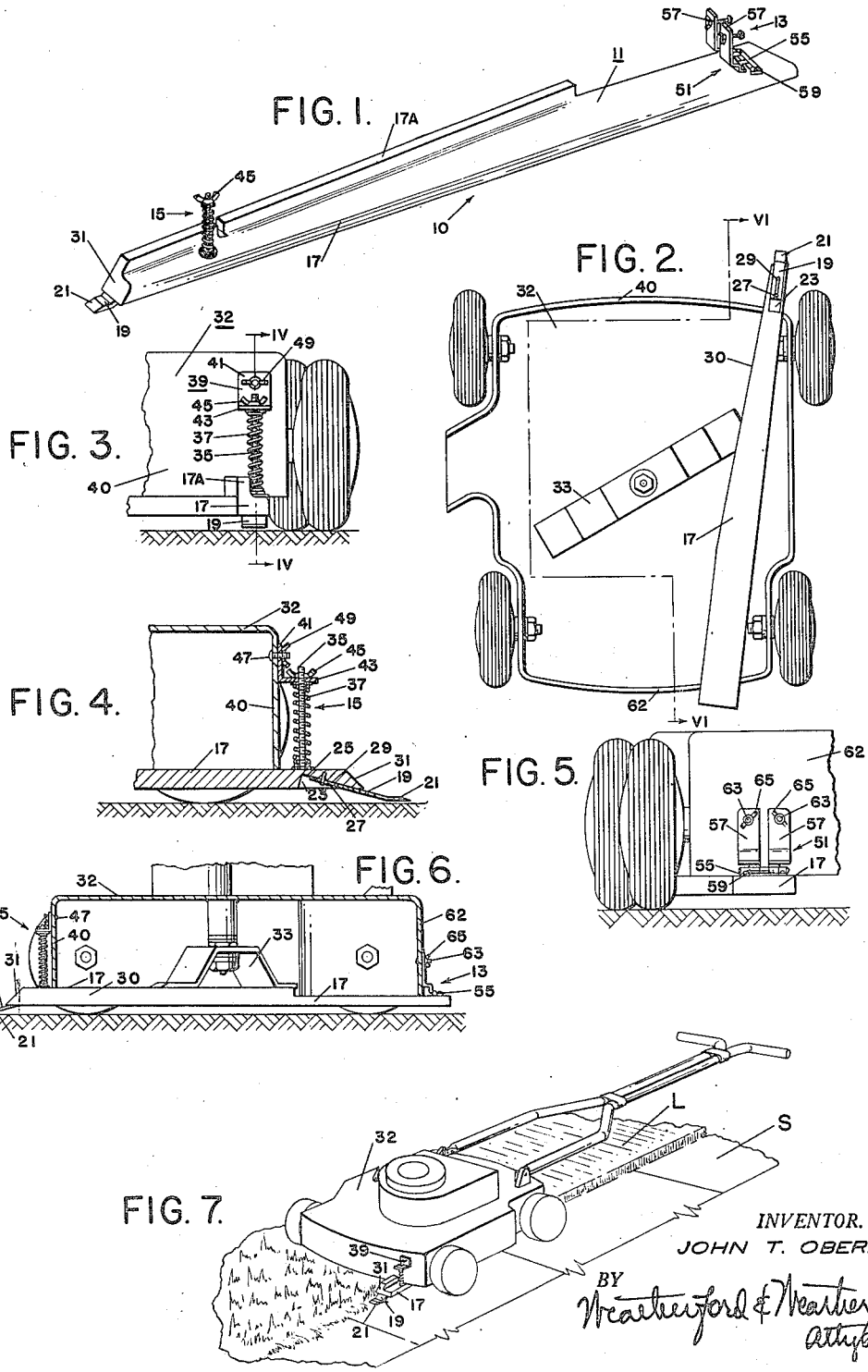

2,782,583

TRIMMER ATTACHMENT FOR MOWERS

John T. Oberle, Memphis, Tenn.

Application December 12, 1955, Serial No. 552,384

6 Claims. (Cl. 56—25.4)

This invention relates to an attachment adapted to be mounted on a mower. More particularly it relates to such an attachment which, when mounted on a mower, converts the mower to an improved cutting means for low-lying grass, such cutting means being particularly useful as a lawn edge trimmer.

It is contemplated in the present invention that a mower attachment be provided which comprises a grass-positioning member adapted to be resiliently and pivotally connected to a mower, whereby the grass-positioning member is yieldable to the variations in ground contour encountered during grass cutting.

It is further contemplated that the positioning member be provided with a grass lifter blade projecting from the forward end thereof, whereby the blade lifts the grass for upright positioning along one side of the positioning member so that the grass may be cut by the mower blade, thus providing efficient and rapid cutting means for low-lying grass, particularly in the edge trimming of lawns. Such edge trimming may be accomplished quickly and easily in contrast to cutting with hand clippers or other previous types of edge trimmers.

The principal object of the present invention is to provide a grass-positioning attachment adapted for use with a mower.

A further object is to provide such an attachment having resilient connection means adjacent one end thereof, and pivotal connection means adjacent the other end thereof whereby said attachment means is adapted to be resiliently and pivotally connected to a mower.

A further object is to provide in such an attachment a lifter blade projecting from the forward end thereof whereby the lifter blade is adapted to lift grass for the cutting thereof by the cutter blade of the mower.

A further object is to provide means for converting a mower to an efficient and improved grass edge trimmer.

A further object is generally to improve the design and construction of mower attachments.

The means by which the foregoing and other objects of the present invention are accomplished and their manner of accomplishment will be readily understood from the following specification upon reference to the accompanying drawings, in which:

Fig. 1 is a perspective view of the mower attachment of the present invention.

Fig. 2 is an inverted plan view on a reduced scale of a mower illustrating the mower attachment connected thereto.

Fig. 3 is a fragmentary front elevational view on the scale of Fig. 1 of the device of Fig. 2.

Fig. 4 is a fragmentary sectional view taken as on the line IV—IV of Fig. 3.

Fig. 5 is a fragmentary rear elevational view on a similar scale of the device of Fig. 2.

Fig. 6 is a fragmentary sectional view taken as on the line VI—VI of Fig. 2.

Fig. 7 is a perspective view on a further reduced scale illustrating one use of the device.

Referring now to the drawings in which the various parts are indicated by numerals, the attachment 10 of the present invention comprises, in general, an elongated grass-positioning member 11 having pivotal connection means 13 provided adjacent one end thereof, hereinafter referred to as the rearward end, and resilient connection means 15 provided adjacent the other end thereof, hereinafter referred to as the forward end.

Grass-positioning member 11 comprises an elongated bar 17 and a grass lifter blade 19 connected at one end of the bar, preferably that end adjacent resilient connection means 15. Grass lifter blade 19 is preferably broad and substantially flat in construction and extends beyond the forward end of elongated bar 17, being preferably angularly disposed relative thereto, as best illustrated in Fig. 4. The distal end 21 of lifter blade 19 may be turned upwardly to a position substantially parallel to the ground, and may be sharpened on the extreme end portion for more effective results. Grass lifter blade 19 is connected to elongated bar 17 in a recess 23 provided in the bottom of the bar adjacent the forward end thereof. The upper surface 25 of recess 23 is inclined with respect to the longitudinal axis of bar 17 and provides a seat for blade 19 whereby the blade when fitted into position in flat face-to-face engagement with upper surface 25 will be downwardly inclined with respect to the bar. Blade 19 may be held in said flat face-to-face engagement by means of a screw 27 which extends through an elongated slot 29 provided in blade 19 and is threadedly engaged in a threaded aperture provided in bar 17. Thus it will be seen elongated slot 29 and screw 27 provide means by which the blade 19 may be longitudinally positioned relative to the bar.

Elongated bar 17 is preferably of increased height along one side thereof as at 17A to provide a flat grass contacting side or surface 30. Portion 17A preferably extends from the forward end of bar 17 throughout the major portion of its length. The forward end of elongated bar 17 is inclined rearwardly as at 31 to provide guiding means for the grass, the function of which will be more apparent in the hereinafter described use of the present invention.

The attachment 10 of the present invention is particularly adapted to be used with a conventional rotary mower 32 having a blade 33 rotatable in a horizontal plane. While attachment 10 has been illustrated as adaptable with one type of mower, it will be understood that the attachment may be adapted to other types. Pivotal connection means 13 is adapted to attach adjacent the rearward portion of mower 32, and resilient connection means 15 adapted to attach adjacent the forward portion of the mower with elongated bar 17 preferably, though not necessarily, underlying blade 33, and the bar preferably being disposed adjacent one side of the mower.

Thus it will be seen elongated bar 17 in addition to its other functions provides protection means for blade 33, as for example when running the mower along a curb, the bar 17 will protect the blade from the curb edge if the wheels of the mower should run off of the edge.

Resilient connection means 15 may comprise an upstanding threaded stud 35 rigidly carried by elongated bar 17 adjacent the forward end thereof. A spring 37 is interposed between the upper face of elongated bar 17 and a bracket 39 with stud 35 extending centrally of the spring. Bracket 39 is removably attached adjacent the forward portion of mower 32, preferably to the forward skirt 40 thereof. Bracket 39 is preferably right-angular and preferably includes an upstanding portion 41 having a forwardly projecting portion 43 extending from the lower edge of the upstanding portion and being integrally formed therewith. Forwardly projecting portion 43 is provided with an aperture through which extends stud 35. Downward movement of stud 35 is limited by nut means 45 which is threadedly engaged on the end of the bolt and overlies forwardly projecting portion 43. It is apparent from the foregoing that resilient means is provided for resiliently connecting the forward end of grass-positioning member 11 onto the forward portion of mower 32, it being understood that the normal at rest position of elongated bar 17 is in a downward disposition determined by the abutment of nut means 45 with bracket 39, and it being understood that the elongated bar is urged into such at rest position by spring 37. Also it will be understood limited upward movement of elongated bar 17 is permitted, such upward movement effecting compression of spring 37.

Bracket 39 is removably connected to the forward skirt 40, preferably as by means of a bolt 47 extending through alined apertures in the skirt and in upstanding portion 41, being secured therein as by means of a nut 49 threadedly engaged on bolt 47. It will be understood bolt 47 may be permanently attached to mower 32. Thus for example the mowers as originally manufactured may be provided with bolts 47 whereby attachment 10 may be readily attached thereto, or if desired, the mowers may be originally provided with an aperture for extending bolt 47 therethrough as above described.

Pivotal connection means 13 may comprise a hinge 51 including a bar attachment portion 55 and a mower-attachment portion 57, portions 55, 57 being hingedly connected by a suitable hinge pin. Bar attachment portion 55 may be attached to elongated bar 17 as by bolt means 59 extending through alined apertures in elongated bar 17 and in portion 55. Mower attachment portion 57 is preferably divided into two sections, as illustrated, whereby the hinge 51 will conform to various shapes of the mowers. Thus mower attachment portion 57 will lie flat against a flat surfaced mower or a curved surface mower when attached thereto. Each of the sections of portion 57 may be attached to the rearward skirt 62 of mower 32 by means of a bolt 63 extending through alined apertures in the skirt and in the section and secured therein as by means of a nut 65. If desired, bolt 63 may be permanently attached to mower 32 as previously described for the attachment of bolt 47 with the mower.

In the embodiment shown, hinge 51 is mounted on elongated bar 17 in a skewed disposition whereby the elongated bar is disposed out of parallelism with the longitudinal center line of the mower, and from front to rear converges toward the center line. Additionally, in the embodiment shown, the grass contacting side 30 of bar 17 preferably diverges rearwardly away from the opposite side of the bar and converges toward the longitudinal center line of the mower. The above mentioned skewed disposition of bar 17 and divergence of side 30 accommodates attachment 10 of the present invention to the particular mower shown, and it should be understood that it is not intended that the invention be limited to this precise disposition disclosed, but may be modified to conform to other types of mowers. In addition it will be seen that the forward end of bar 17 and blade 19 is positioned at the front of the mower laterally offset from and forwardly of the path of mower blade rotation, and that the convergence of side 30 toward the mower center line also converges to underlie a sector of the rotational path of the mower blade, thus serving to efficiently guide lifted and upheld grass into the cutting path of the mower blade 33.

With the attachment of the present invention mounted on mower 32 the bottom of elongated bar 17 is closely spaced from the ground with the distal end 21 of lifter blade 19 being closely adjacent the ground, it being understood that the lifter blade may be positioned in a manner as heretofore described to the most effective disposition relative to the ground. Also it will be understood the amount of spacing of elongated bar 17 from the ground may be varied by adjusting nut means 45 on stud 35.

One use of the device of the present invention is best illustrated in Fig. 7 wherein the device is shown as being used in conjunction with a mower to trim the edge of a lawn. In the use of the mower and attachment combination as an edge trimmer, the mower is moved along the border to be trimmed, as for example the border of lawn L and sidewalk S, shown in Fig. 7, with the grass lifter blade 19 underlying the flat-lying fringe grass which extends over the sidewalk S. Thus as the mower is moved along in a forward direction the grass lifter blade 19 will turn the grass upwardly whereupon the grass will be further guided into an upstanding position by inclined end 31 and will be held in the upright position as it passes along grass-contacting side 30. As the upstanding fringe grass passes along the grass-contacting side 30 it is cut by blade 33 which is closely adjacent the top of increased portion 17A.

From the foregoing, it is apparent that a mower attachment is provided which is quickly and easily attachable to and detachable from a mower. Additionally it is apparent that such an attachment, when mounted on a mower, converts the mower into an efficient and rapid means for trimming low-lying grass. Thus a mower equipped with the present mower attachment is particularly useful for cutting lawn edges, whereby the edges may be trimmed as the operator pushes the mower along at a natural walking gait, in contradistinction to the time consuming and laborious task of trimming lawn edges with hand clippers and the like.

I claim:

1. The combination with a mower, provided with a rotatable cutter blade, of an attachment comprising an elongated bar having a forward end and a rearward end, said bar being hingedly connected adjacent said rearward end to said mower, said bar being resiliently connected adjacent said forward end to said mower, and a lifter blade projecting from the forward end of said bar, said lifter blade being adapted to lift grass for the cutting thereof by said cutter blade.

2. The combination with a rotary type mower, provided with a horizontally rotatable cutter blade, of an attachment comprising an elongated grass-positioning member, said grass-positioning member being pivotally connected adjacent one end to said mower and resiliently connected adjacent the other end to said mower whereby said grass-positioning member is yieldable to the variations in ground contour encountered during grass cutting, said grass-positioning member underlying said cutter blade whereby the blade is protected by the grass-positioning member; said grass-positioning member including an elongated bar having a rearwardly inclined grass-elevating face adjacent the forward end thereof and an upright longitudinal grass-contacting side extending rearwardly from said grass-elevating face and converging toward the rotational path of the cutter blade, and a leading grass lifter blade projecting from the forward end of said elongated bar.

3. The combination with a rotary type mower, provided with a horizontallly rotatable cutter blade, of an attachment comprising an elongated grass-positioning member, said grass-positioning member being pivotally connected adjacent one end to said mower and resiliently connected adjacent the other end to said mower whereby said grass-positioning member is yieldable to the variations in ground contour encountered during grass cutting, said grass-positioning member underlying said cutter blade whereby the blade is protected by the grass-positioning member.

4. The combination with a mower, provided with a rotatable cutter blade, of an attachment comprising an elongated grass-positioning member, said grass-positioning member being pivotally connected adjacent one end to said mower and resiliently connected adjacent the other end to said mower whereby said grass-positioning member is yieldable to the variations in ground contour encountered during grass cutting, said grass-positioning member including an elongated bar having a grass lifter blade rigidly carried thereby and projecting from one end thereof.

5. An attachment for a rotary mower provided with a horizontally rotating cutter blade comprising an elongated grass-positioning member, said grass positioning member having resilient attachment means provided adjacent one end thereof for resiliently connecting the bar adjacent one end thereof to the mower, said grass-positioning member having pivotal connection means provided at the other end thereof for pivotally connecting the bar adjacent the other end thereof to the mower, said grass-positioning member including an elongated bar having a grass lifter blade adjustably carried thereby and angularly projecting from one end thereof.

6. An attachment for use with a rotary mower provided with a horizontally rotating cutter blade, said attachment comprising an elongated grass-positioning member, said grass-positioning member having resilient attachment means provided adjacent one end thereof for resiliently connecting the bar adjacent one end thereof to the mower, said grass-positioning member having pivotal connection means provided at the other end thereof for pivotally connecting the bar adjacent the other end thereof to the mower, said grass-positioning member including an elongated bar having a rearwardly inclined grass-elevating face adjacent the forward end thereof and an upright longitudinal grass-contacting side extending rearwardly from said grass-elevating face and adapted to converge toward the rotational path of the cutter blade when the attachment is attached to a rotary mower, and a leading grass lifter blade projecting from the forward end of said elongated bar.

References Cited in the file of this patent

UNITED STATES PATENTS 2,711,064     Parker _____ June 21, 1955